May 1, 1928. 1,667,743
E. G. SIEVERT ET AL
VOLTAGE GRADIENT REGULATOR FOR HIGH TENSION CABLE ENDS
Filed Nov. 9, 1925
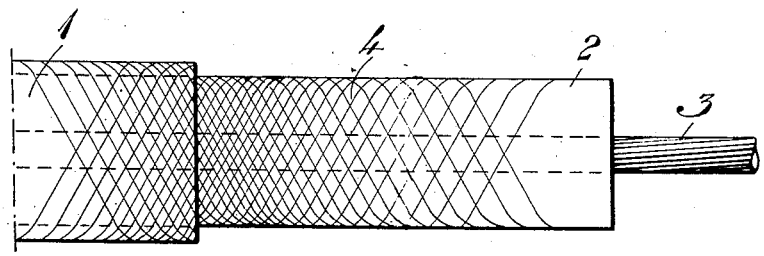
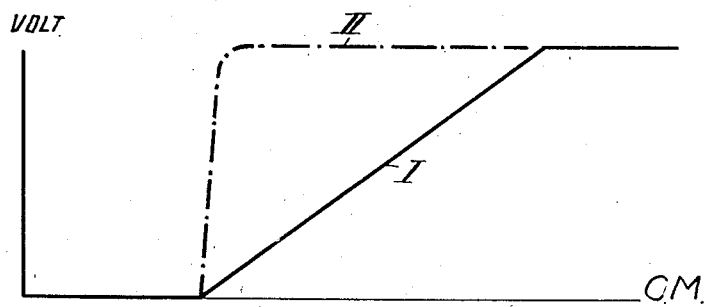
E. G. Sievert and H. Svenson
Inventors
By: Marks and Clerk
Attys Patented May 1, 1928.

1,667,743

UNITED STATES PATENT OFFICE.

ERNST GUSTAV SIEVERT AND HENNING SVENSSON, OF SUNDBYBERG, NEAR STOCKHOLM, SWEDEN.

VOLTAGE-GRADIENT REGULATOR FOR HIGH-TENSION CABLE ENDS.

Application filed November 9, 1925, Serial No. 67,948, and in Sweden November 20, 1924.

When joining cables in junction boxes the lead sheathing is, as is well known, removed at the end of the cable, and, the length of this removed part being increased the higher is the tension of the cable, in order to prevent a breaking down between the conductor in the cable and the lead sheath. At lower tensions the desired result will also be obtained in this way and there is indicated, in works bearing on this topic, that the length of the insulation between the copper conductor and the outer edge of the lead sheath should amount to about 2 cm. per thousand volts. When, however, very high tensioned currents are employed, that is, 20000 volts or more, it becomes evident that a total breaking down can be prevented by removing a sufficient length of the sheathing, but, on the other hand, partial punctures and discharges take place next to the edge of the sheathing, however long the latter may be removed. This may depend upon the fact that the strength of field in the outer layer at the edge of the sheath may in this case be so great that partial discharges take place. If these discharges occur in an air layer the resistance of the path of current will be reduced so as to easily effect a breaking down. In order to prevent this it has been necessary, up till now, to maintain the cable ends of such high-tension cables submerged in oil or the like, thereby keeping out the air.

The present invention refers to an arrangement, by which said inconveniences are prevented and it will be possible to join high-tension cables by means of common cable junction boxes, using cable ends, the insulation of which is removed from a relatively short length of the conductor.

The invention is based on the idea of equalizing the voltage drop in the axial direction of the cable at the cable end, when stripped, so that the voltage drop per unit of length is either maintained constant or is regulated so as to make it decrease successively and not suddenly between the sheath and the insulation; the invention is characterized by the fact that the insulating material round that part of the conductor, from which the sheathing is removed, is surrounded by a braiding of a poor conducting yarn material or taping, having a smaller dielectric resistivity than the insulating material of the cable, that the yarn material is connected with the sheathing or the cable box and that the yarn material or taping in question is applied in such a way that the voltage drop between the insulating material and the sheathing or the cable box is distributed along a considerable length and in no point per unit of length amounts to the value necessary for starting a breaking down.

The annexed drawing shows in Fig. 1 a cable end according to the invention, while Fig. 2 illustrates the voltage drop per unit of length with and without the present arrangement.

1 is the cable sheathing, 2 the bared part of the insulation and 3 the conductor. Round the insulation adjacent the sheathing there is, according to this invention, arranged a braiding 4 consisting of a poor conducting yarn material or taping. The specific dielectric conductivity should be greater than that of the insulating material. This braiding is applied in a quantity or thickness decreasing towards the bare conductor, by which fact the voltage drop between the sheath and the insulation is distributed along a relatively great length, so that the voltage drop per unit of length will be relatively small and below the value which permits partial discharges to take place. The course of the voltage drop is indicated in Fig. 2 by the curve I, drawn in full. The dotted curve II, on the other hand, shows the course of the tension drop without the arrangement according to the invention, this last mentioned curve setting forth that the voltage drop per unit of length in the proximity of the lead sheath is greater than in the case illustrated by the curve I. As a material suitable for the tension equalizing braiding 4 asbestos in the shape of yarn or tape may be used, the braiding being wrapped round the cable end in a quantity decreasing in the direction of the bare conductor. Other arrangements may, of course, be used. For instance, a mantle or sleeve, previously braided, of asbestos or other material having a great resistance may be employed. It is, of course, not necessary to apply the tension equalizing braiding in such a way as to make the voltage drop quite constant, but the effect aimed at by this invention is obtained when taking care that the voltage drop amounts in no point to that value, at which discharges will take place.

Having now particularly described the nature of our invention and the manner of its operation, what we claim is:

1. A high-tension cable terminal comprising in combination, a conductor, a metallic sheath surrounding the conductor, said conductor having a covering of insulating material disposed within said sheath, and a layer of poor conducting material whose dielectric resistivity is less than that of said insulating material, said layer surrounding said insulating material and engaging said sheath.

2. A high-tension cable terminal comprising in combination, a conductor, a metallic sheath surrounding the conductor, said conductor having a covering of insulating material disposed within said sheath, and a layer of poor conducting fabric whose dielectric resistivity is less than that of said insulating material, the end of said sheath being spaced from the end of the conductor, said layer surrounding that portion of said insulating material between the end of the sheath and the end of the conductor and engaging said sheath.

3. A high-tension cable terminal as claimed in claim 2, said fabric comprising a plurality of braided asbestos yarns.

4. A high-tension cable terminal as claimed in claim 2, said fabric comprising a plurality of braided yarns, the relative spacing of said yarns diminishing towards the end of said sheath.

In testimony whereof we herewith affix our signatures.

ERNST GUSTAV SIEVERT.
HENNING SVENSSON.